(12) United States Patent
Milburn

(10) Patent No.: US 8,486,213 B2
(45) Date of Patent: Jul. 16, 2013

(54) METHOD OF MAKING COMPOSITE LAMINATED PRODUCT

(75) Inventor: Douglas I. Milburn, Sydney (CA)

(73) Assignee: Advanced Glazing Technologies Limited (AGTL), Sydney, NS (CA)

( * ) Notice: Subject to any disclaimer, the term of this patent is extended or adjusted under 35 U.S.C. 154(b) by 852 days.

(21) Appl. No.: 11/427,128

(22) Filed: Jun. 28, 2006

(65) Prior Publication Data

US 2006/0291200 A1 Dec. 28, 2006

(30) Foreign Application Priority Data

Jun. 28, 2005 (CA) ...................................... 2510947

(51) Int. Cl.
*B60Q 1/26* (2006.01)

(52) U.S. Cl.
USPC ........................................ 156/272.2; 156/109

(58) Field of Classification Search
USPC ................... 156/99, 100, 102, 103, 104, 105, 156/106, 107, 108, 109, 272.2
See application file for complete search history.

(56) References Cited

U.S. PATENT DOCUMENTS

| | | | | |
|---|---|---|---|---|
| 3,711,189 A * | 1/1973 | Novotny et al. | ............... | 359/894 |
| 3,912,542 A * | 10/1975 | Hirano et al. | ................. | 156/104 |
| 6,699,558 B1 * | 3/2004 | Milburn | .......................... | 428/73 |
| 2004/0147663 A1 * | 7/2004 | Silvers et al. | ................. | 524/501 |
| 2005/0003148 A1 * | 1/2005 | Myles et al. | ................... | 428/116 |

* cited by examiner

*Primary Examiner* — Daniel McNally
(74) *Attorney, Agent, or Firm* — Marks & Clerk

(57) ABSTRACT

A method of making a composite light diffusing panel including at least spaced apart lites with a fabric layer applied to an inner surface of at least one of said lites, involves applying a transparent adhesive to the layer of fabric or the lite(s), firmly applying the layer of fabric onto the lite(s) to avoid wrinkling fabric, curing the adhesive to bond the fabric to the lite(s), and assembling the lites to form the light diffusing panel. In this way, a functionally useful product can be obtained that does not suffer from wrinkling and other distracting effects.

15 Claims, 1 Drawing Sheet

METHOD OF MAKING COMPOSITE LAMINATED PRODUCT

FIELD OF THE INVENTION

This invention relates to the field of light transmissive panels, and in particular to a method of making a composite laminated product for use in such panels.

BACKGROUND OF THE INVENTION

In the construction industry, light diffusing panels are used as to save electricity costs by improving the use of natural daylight in buildings and also to provide pleasing lighting effects. One such panel, known as Solera™, is manufactured by Advanced Glazings Ltd. of Nova Scotia. This panel is in the form of a glass sandwich unit filled with a combination of materials that diffuse light, determine aesthetics, and provide sound insulation. The Solera 'sandwich' consists, in sequence, of a first lite or pane of glass, a first layer of fabric (usually but not necessarily glass fibre), a honeycomb transparent insulation, a layer of fabric (usually but not necessarily glass fibre), and a second a lite of glass. Another company, Okalux of Germany, manufactures units with layed-in fabric similar to Solera.

The combination of glass and fabric create a unique and elegant aesthetic effect that is a key feature of the product. However, under certain lighting conditions, such as direct sunlight at grazing incidence, any wrinkling of the fabric or other irregularities or differences between the plane of the fabric and the plane of the inner surface of the glass lite become visible and give rise to an obvious and ugly aesthetic effect.

Films are commonly applied to the exterior surface of insulated glass units, usually on the building interior. Most films are dark or reflective and used to reduce the amount of sunlight entering the building. Other films are light diffusing and used to emulate etched glass (3M makes lots of window films). Other window films are used to retain glass fragments in the event of breakage, imparting properties such as safety, security, and blast resistance. However, window films are harder to laminate because of the formation of air bubbles. Venetian blinds and drapery are sometimes installed in the space between lites in double glazed windows, doors, or insulated glass units.

SUMMARY OF THE INVENTION

When units are built with certain fabrics and with dimensions over a threshold vertical dimension, the fabric becomes unstable and is subject to wrinkling, sagging or movement of the fabric during manufacture, transport, installation and use. Other factors contributing to these effects include the enhanced coefficient of friction between the rigidized surface of honeycomb and fabric, stresses arising during assembly, contact of edge of the fabric and spacer, and thermal cycling from sunlight exposure, and sometimes shock from transportation.

The challenge facing the inventor was to find a way of eliminating the above-noted problems without adversely affecting the appearance of the product or interfering with its transmissive properties. The inventor has found that contrary to what might be expected, the fabric can be glued to the lite while still retaining the fundamental character of fabric against glass, and also retaining the light-diffusing properties of the fabric-lite combination. Currently, the inventor is striving for an exact visual match so that the impact of the adhesive is minimal, but it is also possible to intentionally give the adhesive some visual impact so long as it is aesthetically acceptable.

According to the present invention there is provided a method of making a composite light diffusing panel comprising at least spaced apart lites with a light transmissive fabric layer applied to an inner surface of at least one of said lites, said method comprising applying a light transmissive adhesive to said layer of fabric or said at least one lite at a density of between 0.05 and 2 g/sq.ft; firmly applying said layer of fabric onto said at least one lite to avoid wrinkling of said fabric; curing said adhesive to bond said fabric to said at least one lite; and assembling said lites to form said light diffusing panel.

The densities are based on the cured weight of adhesive. In one embodiment the adhesive is applied at a density of about 0.5 g/sq.ft.

The adhesive may conveniently be atomized, although alternatively it could be applied by means of a printing roller or like device. Atomization is the currently preferred process.

The lites are normally made of glass, or they could be made of some other light transmissive material, such as Perspex™, for example.

A surprising aspect of the invention is that it has been found that the fabric can be bonded effectively to glass without any detectable changes in appearance as might be expected if an adhesive layer were applied to the lites, for example. Suitable adhesives are water based acrylic pressure sensitive adhesives with high clarity, typically, but not necessarily with minimal color or yellowing, waterproof, and UV stable, such as Alpha Systems and Bostik™, although other solvent-based adhesives may be employed. The adhesives are preferably sprayed onto the fabric by an air or airless sprayer. An air type sprayer gives finer atomization and is preferred.

Acrylic adhesives are preferred because of their high clarity and UV stability. Using a UV cure adhesive is an option, but it must either be of non-oxygen-inhibiting type, or the surface must be immersed in an inert atmosphere during curing, which is not always a practical option.

When applied to the fabric, the adhesive makes it tacky. The fabric can then applied to the lite preferably by roll lamination. Roll lamination has proved to be optimal because it has the least probability of wrinkling.

The invention also provides a composite light diffusing panel comprising at least spaced apart lites with a light transmissive fabric layer applied to an inner surface of at least one of said lites, wherein said layer of fabric is glued to said at least one lite with an adhesive applied at a density of between 0.5 and 2 g/sq.ft.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 2:
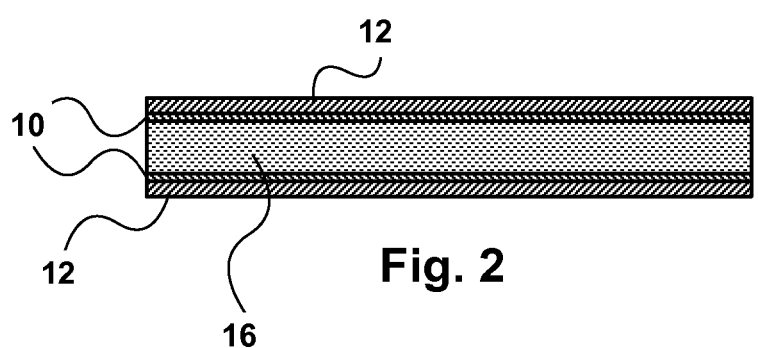
FIG. 2 is a cross section through a composite panel in accordance with one embodiment of the invention.

A composite panel made in accordance with one exemplary embodiment of the invention is shown in FIG. 2. It consists of a pair of glass lites 12, lined on the inside with a fiber glass fabric layer 10 and spaced apart by a honeycomb transparent insulation 16 of the type made, for example, by Advanced Glazings of Nova Scotia. The "lites" or panes 12, while normally glass could be made of other translucent or transparent material, such as Perspex™.

As noted previously, in the prior art the fabric was just compressed between the honeycomb insulation and the associated lite and had a tendency to wrinkle during manufacture of subsequent use.

Figure 1:
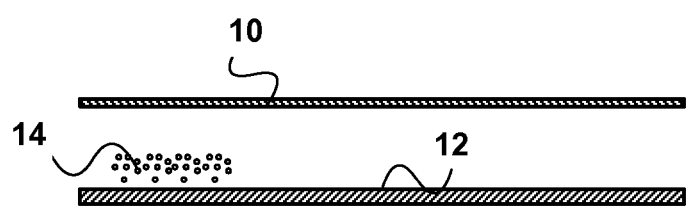
FIG. 1 illustrates schematically the step of applying a layer of light transmissive fabric to a glass lite.

In accordance with the principles of the invention, the light transmissive fabric is applied to one or both of the lites by first applying an adhesive 14 either to the fabric or the lite, as shown in FIG. 1. The inventors have found that if a suitable adhesive is applied in atomized form, and the fabric is then firmly applied to the lite, it is possible to adhere the fabric to the light in a manner such that it is not visible in the final product shown in FIG. 2.

Although water based acrylic pressure sensitive adhesives have been tested, the use of UV-cure resins, such as acrylic oligimers with appropriate catalyst, offer interesting possibilities because of the instant high strength permanent nature of the bond.

In an alternative the adhesive can also be sprayed on the glass rather than the fabric. A different look is achieved, 'pebbled' like commonly available 'pinhead morroco' decorative glass. However, unless care is taken to mask that area, the perimeter of the glass becomes covered with adhesive and this may interfere with application of the spacer and sealant in the ultimate sandwich product.

The fabric is preferably a non-woven glass fiber fabric, typically a fiber glass veil, which is known in the art and which is a highly filamentized fiber glass fabric. The adhesive should be applied at a density of between about 0.05 g/sq.ft and 2 g/sq. ft, with the optimum value being about 0.5 g/sq.ft. Below 0.05 g/sq.ft, the fabric and will not bond properly, and above 2 g/sq.ft, the adhesive saturates and the results appear ugly. Also, if the fabric is saturated with adhesive, the light diffusion properties drop because there is less difference in the index of refraction between adhesive and fiber than between fiber and air. The use of a very light coat of adhesive prevents the loss of light diffusion properties.

If desired colors or pigments can be added to the adhesive to achieve interesting aesthetic effects and patterns. It is not necessary to completely cover the surface, and intentionally omitted areas can be used to create images or for other aesthetic or design reasons.

The methods in accordance with embodiments of the invention prevent wrinkling in stacked translucent glazings such as Solera or Okalux. While wrinkling is less of a problem in small glass units with stiff flat fabric, it becomes critical for larger units (say, 60" or larger vertical dimension) or units with weak or inherently wrinkly fabrics.

The invention also permits a lower performance but less expensive insulated glass unit without a honeycomb core. In this case fabric is bonded to one or more interior surfaces in an insulated glass unit. This has a similar appearance and light diffusion properties similar to Solera, such that the fabric stays in place.

The novel technique in accordance with the invention also simplifies manufacturing of all of the above insulated glazing units. Without this invention, the fabric must be handled separately during assembly, and is subject to wrinkling, contamination, incorrect placement and dimensional tolerance issues. The latter refer to fit and orientation between fabric and perimeter spacer. If the fabric is too large or is placed incorrectly, the fabric will interfere with the spacer potentially causing compressive stress and wrinkling. If the fabric is too small or placed incorrectly, a gap will exist between spacer and fabric layer, which appears as poor fit, and in backlight conditions as a bright corona.

EXAMPLES

An Alpha 8011 water based acrylic adhesive was sprayed by air-type spray gun glass onto a Johns Manville 8110 glass fiber fabric (veil) at a density of about 0.5 g/sq.ft. The fabric, known as AGL 401, has a density of 3.1 g/sq.ft. This was then laminated onto clear glass using a rubber roller.

The resulting fabric-laminated lites could then be used to fabricate Solera™ insulating glass units. Optionally, a drying process utilizing heat and/or air flow may be employed, which would yield increased holding power, but it was not found to be necessary.

The same materials were used to fabricate a double glazed insulated unit with ½" airspace, aluminum spacer with polyolefin foam tape with acrylic adhesive as primary seal and Tremco Proglaze II structural silicone as secondary seal, and silica gel desiccant.

Other fabrics satisfactorily tested include AGL 300 with a density of 4.6 g/sq.ft, and AGL 510 from Owens Corning with a density of 11.0 g/sq.ft. Another fabric thought to be suitable is known as AGL 210. This is a light and open fabric manufactured by Nicofiber and has a density of 2.3 g/sq.ft.

The overall effect was pleasing, and yet the functional purpose of the units was unimpaired.

I claim:

1. A method of making a composite light diffusing panel, the method comprising the steps of:
   providing at least two spaced apart lites;
   providing a spacer to maintain a gap therebetween;
   providing a light transmissive fabric to be adhered to an inner surface of at least one light;
   sizing the fabric such that it is small enough prevent interference with the spacer thereby avoiding wrinkling, and large enough to prevent presence of a gap between the spacer and the fabric;
   applying a light transmissive adhesive to said layer of fabric or to said inner surface at a density of about 0.5 g/sq.ft and 2 g/sq.ft so that the fabric layer is unsaturated with adhesive to prevent loss of light diffusion properties;
   adhering the light transmissive fabric layer to only an inner surface of one of said spaced apart lites;
   curing said adhesive to bond said fabric to said at least one lite; and
   assembling said lites to form said light diffusing panel.

2. A method as claimed in claim 1, wherein said adhesive is a water based pressure sensitive acrylic based adhesive.

3. A method as claimed in claim 2, wherein said adhesive is sprayed onto said at least one lite.

4. A method as claimed in claim 3, wherein said adhesive is air sprayed.

5. A method as claimed in claim 1, wherein said lites are separated by a transparent insulating matrix.

6. A method as claimed in claim 5, wherein said transparent insulating matrix is honeycomb insulation.

7. A method as claimed in claim 1, wherein said light transmissive adhesive is applied at a density of about 0.5 g/sq.ft.

8. A method as claimed in claim 1, wherein said adhesive is applied in atomized form.

9. A method as claimed in claim 1, wherein said layer of fabric is applied by rolling.

10. A method as claimed in claim 1, wherein said fabric is ironed onto said at least one lite.

11. A method as claimed in claim 1, wherein said adhesive is a UV curable adhesive.

12. A method as claimed in claim 1, wherein colors or pigments are applied to said adhesive to form a pattern.

13. A method as claimed in claim 1, wherein said lites are made of glass.

14. A method as claimed in claim 1, wherein said fabric is a fiber glass veil.

15. A method of making a composite light diffusing panel comprising at least spaced apart lites with a light. transmissive fabric layer applied to an inner surface of at least one of said lites, said method comprising: applying an light transmissive adhesive to said layer of fabric or said at least one lite at a density of between 0.05 and 2 g/sq.ft; firmly applying said layer of fabric onto said at least one lite to avoid wrinkling of said fabric; curing said adhesive to bond said fabric to said at least one lite; and assembling said lites to form said light diffusing panel, wherein said layer of fabric is applied by hand and manipulated with the aid of bars temporarily bonded to either end of the fabric.

\* \* \* \* \*